United States Patent [19]
Dell'Orto

[11] Patent Number: 4,748,853
[45] Date of Patent: Jun. 7, 1988

[54] INTERFACE CIRCUIT BETWEEN A SENSOR, PARTICULARLY A THICK FILM PRESSURE SENSOR AND AN ELECTRODYNAMIC INSTRUMENT, AND A SENSOR INCORPORATING SUCH A CIRCUIT

[75] Inventor: Giuseppe Dell'Orto, Milan, Italy

[73] Assignee: Marelli Autronica S.p.A., Pavia, Italy

[21] Appl. No.: 908,538

[22] Filed: Sep. 17, 1986

[30] Foreign Application Priority Data

Sep. 17, 1986 [IT] Italy ............................ 67788 A/85

[51] Int. Cl.$^4$ ............................................. G01L 9/06
[52] U.S. Cl. ......................................... 73/727; 73/754
[58] Field of Search ............... 73/727, 117.2, 721, 73/754, 756, DIG. 4, 175, 117.3; 128/748, 903; 338/4, 42

[56] References Cited

U.S. PATENT DOCUMENTS 4,471,786 9/1984 Inagaki .......................... 128/748

*Primary Examiner*—Donald O. Woodiel
*Attorney, Agent, or Firm*—Sughrue, Mion, Zinn, Macpeak, and Seas

[57] ABSTRACT

An electrical sensor device, particularly a pressure sensor device, comprises at least one pressure transducer, particularly a thick-film transducer, connected to a monitoring circuit arranged to output an electrical signal which is variable in dependence on the pressure, an interface circuit connected to the monitoring circuit and arranged, in response to the said signal, to present an output resistance which increases or decreases in accordance with a predetermined response curve, on increase in the pressure detected by the transducers.

8 Claims, 3 Drawing Sheets

INTERFACE CIRCUIT BETWEEN A SENSOR, PARTICULARLY A THICK FILM PRESSURE SENSOR AND AN ELECTRODYNAMIC INSTRUMENT, AND A SENSOR INCORPORATING SUCH A CIRCUIT

DESCRIPTION

The present invention relates to electrical sensors, particularly pressure sensors for use in motor vehicles, for monitoring and providing an indication of fluid pressures, such as for example the pressure of the lubricating oil.

Figure 1:
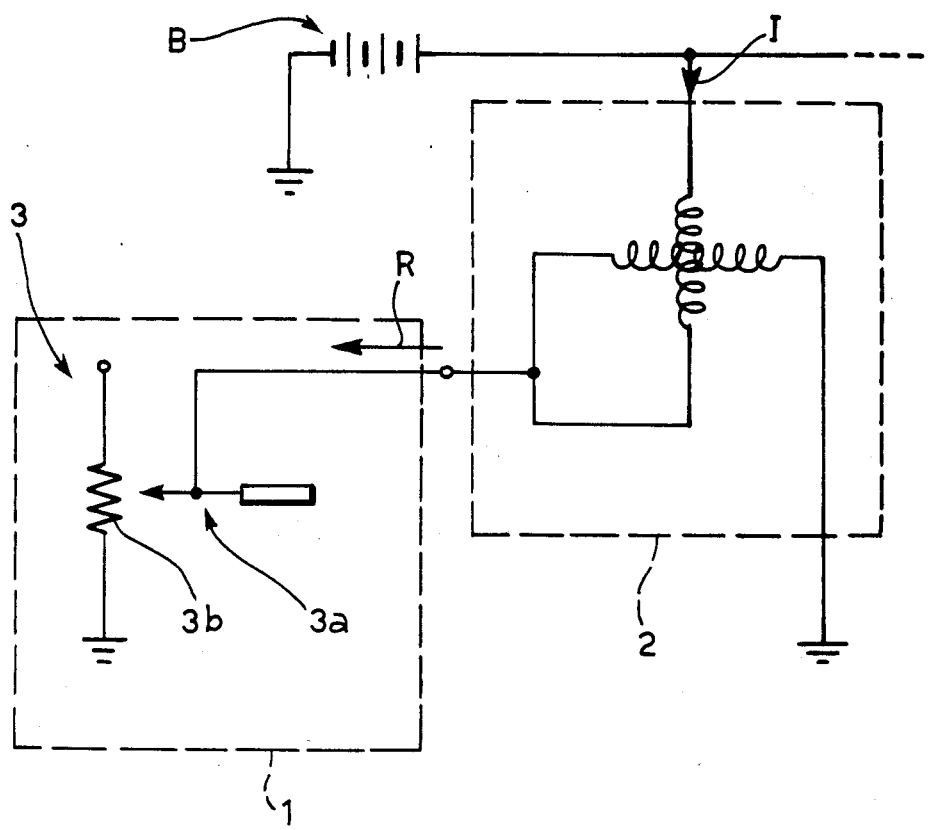

In most land motor vehicles, the most widely used pressure indicators are of the type shown schematically in FIG. 1 of the appended drawings. In this Figure a pressure sensor of the potentiometric type with a mechanical control is indicated 1, powered by the battery B of the motor vehicle and connected to an electrodynamic instrument 2 of the crossed coil type connectible to the battery B by means of the ignition switch (not illustrated). The pressure sensor 1 in general comprises a metal diaphragm, not illustrated, which, by deforming due to the effect of the pressure detected, transmits through a mechanism, a movement to the slider 3a of a potentiometer 3 the resistive element of which is shown at 3b. The current I flowing in the coils of the indicator instrument 2 and thus the position of the pointer of the latter vary in dependence on the position assumed by the slider 3a of the potentiometer 3.

Pressure sensors of the potentiometric type with mechanical control, as described above, include moving parts such as levers or other mechanisms which are subject to high stresses as a result of the forces to which the motor vehicles themselves are subject and are prone to break down.

In recent times pressure sensors have been developed and introduced into the market which use thick-film resistors as the transducer elements, the thick film being applied to an insulating substrate which can deform under the pressure to be measured, and generally constituted by a ceramics material. Such a pressure sensor is described for example in U.S. Pat. No. 4,311,980.

In view of the absence of moving parts, thick film pressure sensors are much stronger than the mechanically-controlled potentiometric type and are practically indestructible.

In thick-film pressure sensors, one or more thick film resistors are generally inserted in a bridge circuit. By suitable configuration and arrangement of these thick-film resistors on the substrate it is possible to take a voltage signal from this bridge circuit which is a linear function of the pressure.

Pressure sensors of the thick film type described above cannot, because of their electrical characteristics, be connected directly to an electrodynamic instrument of the type outline above. The possibility of using an electrodynamic instrument as the indicator is however very attractive both because this type of indicator is in almost general use in current motor vehicles and because such indicators are constructed to have electrical characteristics which are almost identical by almost all the major manufacturers and are also reliable products for which production lines are now very well established.

The object of the present invention is to provide a solution which enables the use of electrodynamic instruments of the type conventionally and generally used in connection with potentiometric pressure sensors with mechanical controls, in connection with electrical sensors other than the said potentiometric pressure sensors with mechanical controls and in particular with pressure sensors of the thick-film type.

Figure 2:
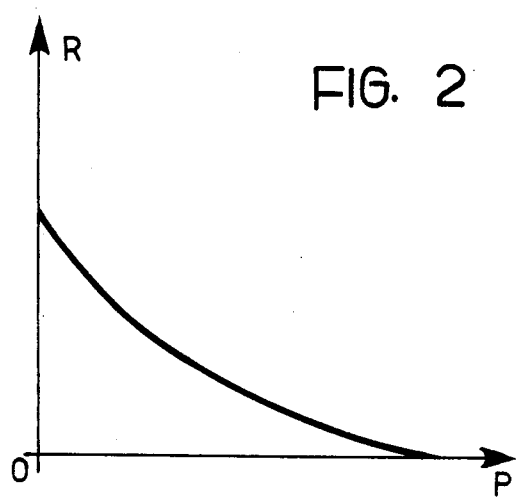

The invention is based on the observation that potentiometric transducers with mechanical control have response curves of the type shown in the graph of FIG. 2, in which there is shown on the ordinate the resistance "seen" at the output of the sensor on variation of the pressure p shown on the abscissa: so that the indicator instrument 2 can be used in connection with a thick film electrical sensor it is necessary for the latter to have a response curve of the type shown qualitatively in FIG. 2.

On the basis of this observation, in order to achieve this object, the present invention provides an electrical sensor device, particularly a pressure sensor device, comprising at least one pressure transducer, particularly a thick-film transducer, connected to a monitoring circuit arranged to output an electrical signal which is variable in a substantially linear manner in dependence on the pressure, characterised in that it further includes an interface circuit connected to the monitoring circuit and arranged, in response to the signal, to present an output resistance which decreases, in accordance with a predetermined response curve, on increase in the pressure detected.

According to a further characteristic, the interface circuit includes:
an output
a switching circuit connected to the output and switchable between first and second conditions in which it presents a minimum resistance and a maximum resistance respectively of predetermined value at the output, and
a converter circuit connected to the monitoring circuit and arranged to supply the switching circuit with a square-wave control signal having a duty-cycle variable between a maximum and a minimum in dependence on the voltage signal output by the monitoring circuit.

The sensor according to the invention is thus, from an electrical point of view, indistinguishable from the mechanical potentiometric pressure sensor and hence may be coupled directly to an indicator instrument of conventional electrodynamic type.

The invention also relates to particular modes of realising the said interface circuit as is clear from the appended claims.

Figure 3:
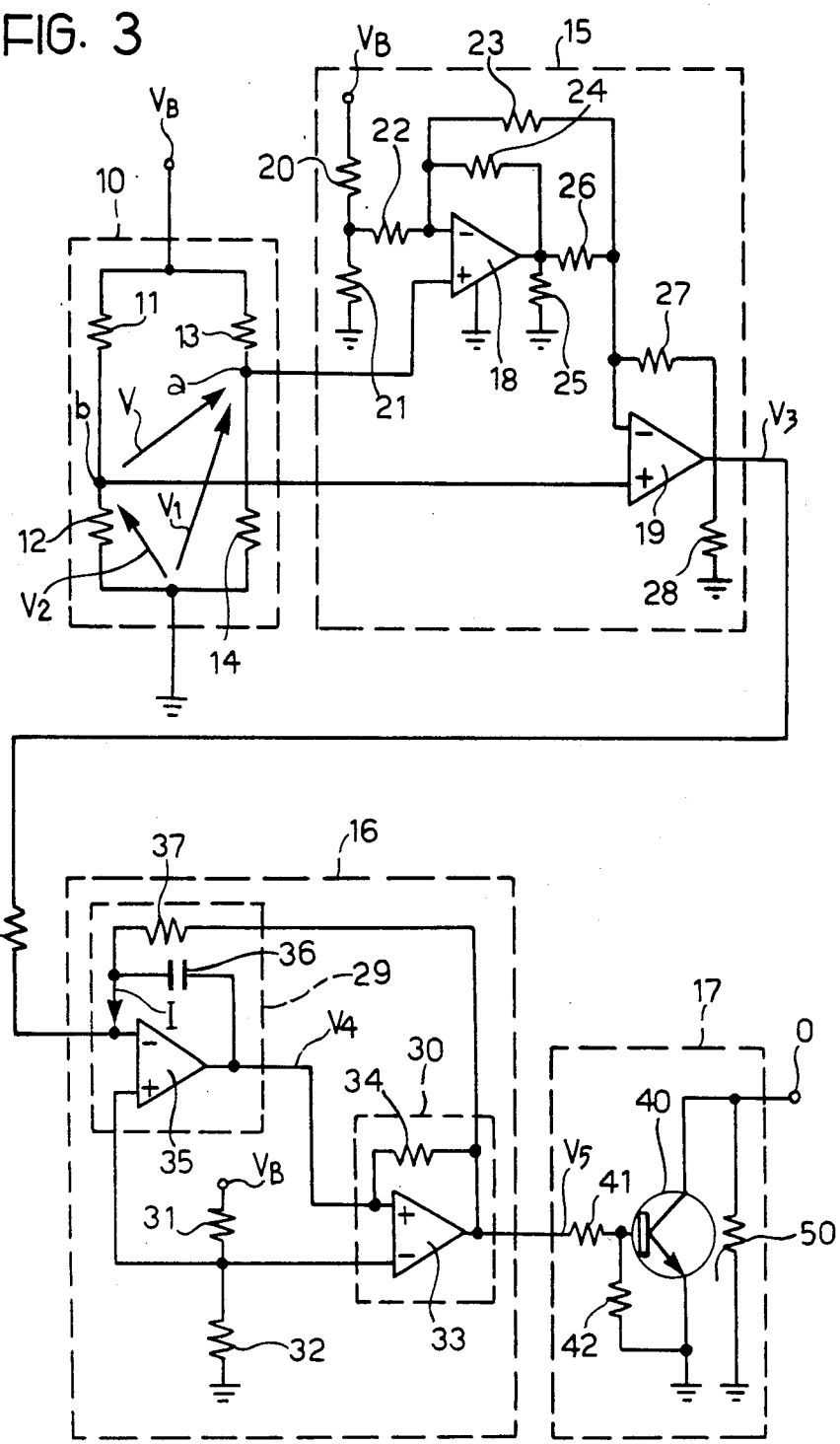
Figure 4:
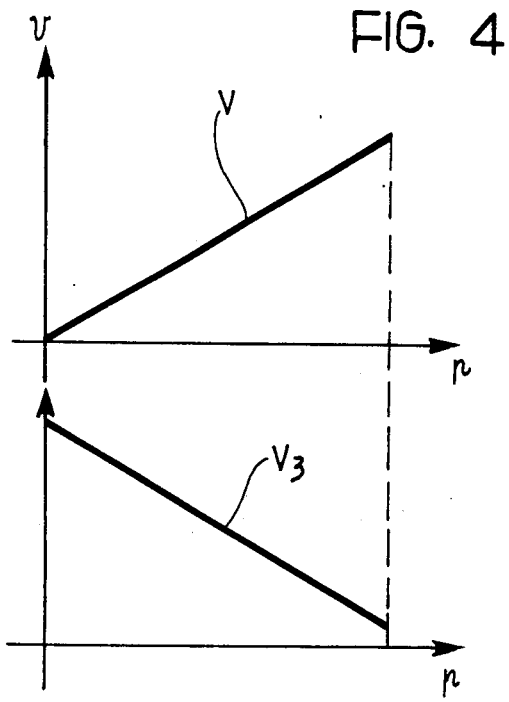
Figure 5:
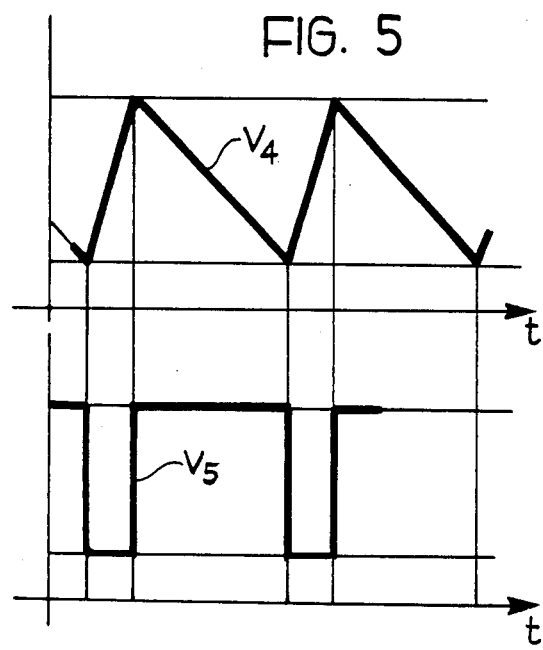

Further characteristics and advantages of the invention will become apparent from the detailed description which follows, given with reference to the appended drawings, provided purely by way of non-limiting example, in which:

FIG. 1, already described, is the electrical circuit diagram of a pressure indicator of conventional type, including an electrodynamic instrument with crossed coils, FIG. 2, also described above, illustrates qualitatively the response curve of a mechanical control potentiometric pressure sensor, FIG. 3 is the electrical diagram of one mode of realisation of a pressure sensor according to the invention, FIG. 4 shows two orthogonal graphs showing the changes in two voltage signals of the device shown in FIG. 3 as a function of the pressure p shown on the abscissa, and FIG. 5 is a series of two graphs showing the waveforms of another two signals generated in the device of FIG. 3 in operation.

In FIG. 3 a bridge circuit is generally indicated 10 and is formed by four thick-film resistors 11 to 14. These resistors are applied in known manner to a substrate which is deformable under the action of a pressure to be measured. The bridge 10 is connected between a d.c. voltage supply $V_B$ and earth. The other diagonal junctions a and b of the bridge are connected to a processing and amplifying circuit generally indicated 15. This latter is connected in its turn through a resistor R to an astable oscillator circuit 16, the output of which is connected to the input of a switching circuit generally indicated 17.

The voltage between the points a and b of the bridge 10 is indicated V: this voltage, in the thick film sensors of known type, is a linear function of the pressure p detected, as shown qualitatively by the upper graph in FIG. 4. The voltage V is equal to the difference between the voltages $V_1$ and $V_2$ of the junctions a and b relative to earth. The voltages $V_1$ and $V_2$ are applied to the non-inverting inputs of two integrated feedback amplifiers 18, 19. The output of the amplifier 18 is connected to the inverting input of the amplifier 19.

As will be immediately apparent to experts in the art, by a convenient choice of the resistors 20 to 28 connected to the amplifiers 18 and 19, it is possible to obtain a voltage signal $V_3$ at the output of the amplifier 19 which, depending on the pressure detected by the bridge circuit 10, changes in the manner shown qualitatively in the lower graph of FIG. 4; the voltage $V_3$ decreases linearly in dependence on the pressure p detected.

The astable circuit 16 includes in known manner an integrating circuit 29 and a non-inverting threshold comparator 30 with hysteresis, connected together in a closed loop. The two resistors 31 and 32 forming a divider between the battery and earth, define the threshold voltage of the comparator 30. This latter includes an integrated amplifier 33 with a feedback resistor 34 between the output and the non-inverting input. The integrator 29 includes an amplifier 35 a capacitor 36 between the output and the inverting input of this amplifier, and a resistor 37. The latter is connected between the output of the comparator 30 and the inverting input of the integrated amplifier 35 to which the output of the integrated amplifier 19 of the processing and amplifying circuit 15 is also connected through the resistor R.

In operation, the integrator 29 outputs in known manner a triangular-wave signal $V_4$ which changes in a manner shown qualitatively in the upper graph of FIG. 5 as a function of the time t shown on the abscissa. The comparator 30 compares this signal with a threshold, and hence this comparator outputs a square-wave signal $V_5$ which changes as shown qualitatively in the lower graph of FIG. 5. This signal is supplied to the base of a transistor 40 of npn type through a resistor 41. A resistor 42 is connected between the base and the emitter of the transistor 40.

A resistor 50 is connected between the collector of the transistor 40 and earth.

The output of the entire device shown in FIG. 3 is represented by the collector of the transistor 40.

In operation, the time periods of the rise and fall of the triangular-wave signal $V_4$, linked to the times for charging and discharging the capacitor 36, vary as a function of the amplitude of the signal $V_3$, and the duty cycle of the square-wave signal $V_5$ varies correspondingly. More particularly, in operation, the charging and discharging current of the capacitor 36, which also depends on the value of R, is modulated by the voltage $V_3$. When $V_3$ is equal to the voltage taken from the divider 31, 32, no current flows through R and the circuit 15 is as it were disconnected from the astable circuit 16, which thus oscillates freely in this situation (with a symmetrical waveform). When $V_3$ differs from the said voltage, the current I directed to the inverting input of 18 is modified correspondingly; to this current is added or subtracted (according to the value of $V_3$) the current flowing in R and there is a consequent variation in the duty cycle of the signal $V_5$. In the periods in which it is at a high level, the signal $V_5$ keeps the transistor 40 saturated and the output O of the switching circuit 17 is practically at the earth potential and the resistance output by this circuit assumes a minimum value. In periods in which the signal $V_5$ is at a low level, the transistor 40 is rendered ineffective and the resistance output by the circuit 17 is practically equal to the resistance of the resistor 50. This resistance must be chosen conveniently, then, to be substantially equal to the value presented by the response curve R of FIG. 2 in correspondence with the value p=0.

It is thus clear that on variation of the pressure p, the variation in the signal $V_3$ causes a corresponding variation in the duty cycle of the signal $V_5$ and hence of the average resistance output by the switching circuit 17. With regard to the period of the signal $V_5$, it is obviously necessary for this to be very much smaller than the integration constant of the indicator instrument which will be connected to the output of the switching circuit 17: in practice, with known indicator instruments, it suffices for the signal $V_5$ to have a frequency equal to several hundred hertz.

The amplification circuit 15 and the astable multivibrator 16 described above operate in a substantially linear manner and enable an average resistance depending on the pressure, and which approximates to the response curve shown in FIG. 2, to be obtained at the output of the switching 17. The approximation may optionally be improved by the introduction in known manner of non-linear elements into the feedback networks of the integrated amplifiers of circuits 15 and 16.

Naturally, the principle of the invention remaining the same, the forms of embodiment and details of construction may be varied with respect to that described and illustrated purely by way of non-limiting example, without thereby departing from the scope of the present invention.

I claim:

1. An electrical sensor device, particularly a pressure sensor device, comprising at least one pressure transducer, particularly a thick-film transducer, connected to a monitoring circuit arranged to output an electrical signal which is variable in dependence on the pressure, an interface circuit connected to the monitoring circuit and arranged, in response to the said signal, to present an output resistance which increases or decreases in accordance with a predetermined response curve, on increase in the pressure detected by the at least one transducer, wherein the interface circuit includes an output a switching circuit connected to the output and switchable between first and second conditions in which it presents a minimum resistance and a maximum resistance of predetermined value respectively at the output, and a converter circuit connected to the monitoring circuit and arranged to supply the switching circuit with a square-wave signal with a duty-cycle variable between a maximum and a minimum in dependence on the voltage signal output by the monitoring circuit.

2. The device according to claim 1, wherein the switching circuit includes first and second current paths connected in parallel to the output, the second having a smaller resistance than the first, and a controlled switch device connected in the second path for allowing and preventing the flow of current in the said second path in first and second conditions respectively.

3. The device according to claim 1, wherein the converter circuit includes an astable multivibrator.

4. The device according to claim 3, wherein the monitoring circuit comprises a bridge circuit including at least one thick-film resistor acting as a transducer, the voltage between two opposite vertices of the bridge circuit being a linear function of the pressure acting on the at least one thick-film resistor, the converter circuit including a processing and amplifying circuit connected to the vertices of the bridge circuit and arranged to output a control voltage representing a predetermined combination of the voltages at each of the vertices of the bridge circuit relative to earth; the output of the processing and amplifying circuit being connected to the control input of the duty-cycle of an astable multivibrator the output of which is connected to the input of the switching circuit.

5. An interface circuit between a pressure sensor device of the type comprising at least one transducer, particularly a thick-film transducer, arranged to output an electrical voltage signal which is variable in a substantially linear manner in dependence on the pressure detected, and an electrodynamic instrument of the in-series-coil type, including an output, a switching circuit connected to the output and switchable between first and second conditions in which it presents, at the output, a minimum resistance and a maximum resistance of predetermined value respectively, and a converter circuit arranged to supply the switching circuit with a square-wave control signal with a duty-cycle variable between a maximum and a minimum in dependence on the said electrical voltage signal.

6. The circuit according to claim 5, wherein the switching circuit includes first and second current paths connected in parallel to the output, the second having a smaller resistance than the first, and a controlled switch device connected in the second path for allowing and preventing the flow of current in the second path in first and second conditions respectively.

7. The circuit according to claim 5, wherein the converter circuit includes an astable multivibrator.

8. The circuit according to claim 5, particularly for use in connection with a pressure sensor device comprising a bridge circuit including at least one thick-film resistor acting as a transducer, the voltage betwen two opposite vertices of the bridge circuit being a linear function of the pressure acting on the at least one thick-film resistor, characterised in that it includes a processing and amplifying circuit connected to the vertices of the bridge circuit and arranged to output a control voltage representing a predetermined combination of the voltages at each of the vertices of the bridge circuit relative to earth; the output of the processing and amplifying circuit being connected to the control input of the duty-cycle of an astable multivibrator the output of which is connected to the input of the switching circuit.

* * * * *